United States Patent
Nousiainen et al.

(10) Patent No.: US 10,240,289 B2
(45) Date of Patent: Mar. 26, 2019

(54) PROCESS FOR DEWATERING MICROFIBRILLATED CELLULOSE

(71) Applicant: Stora Enso OYJ, Helsinki (FI)

(72) Inventors: Laura Nousiainen, Imatra (FI); Petteri Kostiainen, Huhmari (FI); Petteri Saarinen, Jarvenpää (FI); Jan-Erik Nordström, Nacka (FI)

(73) Assignee: Stora Enso OYJ, Helsinki (FI)

( * ) Notice: Subject to any disclaimer, the term of this patent is extended or adjusted under 35 U.S.C. 154(b) by 284 days.

(21) Appl. No.: 15/034,290

(22) PCT Filed: Nov. 5, 2014

(86) PCT No.: PCT/IB2014/002347
§ 371 (c)(1),
(2) Date: May 4, 2016

(87) PCT Pub. No.: WO2015/068019
PCT Pub. Date: May 14, 2015

(65) Prior Publication Data
US 2016/0265160 A1    Sep. 15, 2016

(30) Foreign Application Priority Data
Nov. 7, 2013    (SE) ...................................... 1351315

(51) Int. Cl.
| F26B 5/14 | (2006.01) |
| D21C 9/18 | (2006.01) |
| C08B 15/02 | (2006.01) |
| D21F 3/00 | (2006.01) |
| D21H 11/18 | (2006.01) |
| C08B 15/00 | (2006.01) |

(52) U.S. Cl.
CPC ................ *D21C 9/18* (2013.01); *C08B 15/00* (2013.01); *C08B 15/02* (2013.01); *D21F 3/00* (2013.01); *D21H 11/18* (2013.01); *F26B 5/14* (2013.01)

(58) Field of Classification Search
CPC .............. D21C 9/18; F26B 5/14; D21H 11/18
USPC .................................................. 34/397–400
See application file for complete search history.

(56) References Cited

U.S. PATENT DOCUMENTS

| 3,256,808 A * | 6/1966 | Hunt ......................... B30B 9/12 100/117 |
| 5,964,983 A | 10/1999 | Dinand et al. |
| 6,197,157 B1 | 3/2001 | Hasenfuss et al. |
| 6,514,381 B1 * | 2/2003 | Stotz ........................ D21C 9/18 162/358.1 |
| 8,182,918 B2 * | 5/2012 | Netravali .................. C08L 1/02 428/411.1 |
| 2006/0134758 A1 | 6/2006 | Levy et al. |
| 2012/0214979 A1 * | 8/2012 | Heiskanen ............. D21H 11/18 536/56 |

FOREIGN PATENT DOCUMENTS

| EP | 2243871 | 10/2010 |
| JP | H05279985 | 10/1993 |
| SE | 1251427 | 6/2014 |
| WO | 9611051 | 4/1996 |
| WO | 9742374 | 11/1997 |
| WO | 2005033024 | 4/2005 |
| WO | 2011080386 | 7/2011 |
| WO | 2012156880 | 11/2012 |
| WO | 2013121083 | 8/2013 |

OTHER PUBLICATIONS

Andritz Kufferath, Technopress and Thechnoflex,Jan. 3, 2012, Andritz Kufferath.*
International Search Report for International application No. PCT/IB2014/002347, dated Mar. 6, 2015.
Paulapuro, H. Papermaking part 1, Stock preparation and wet end, Helsinki: Fapet Oy, 2000, p. 294-298.

* cited by examiner

*Primary Examiner* — John McCormack
(74) *Attorney, Agent, or Firm* — Greer, Burns & Crain Ltd.

(57) ABSTRACT

The present invention relates to a process for dewatering a slurry comprising a microfibrillated cellulose wherein the process comprises the following steps of providing a slurry comprising a microfibrillated cellulose and a liquid, subjecting the slurry to a first mechanical pressure in order to dewater the slurry, and subjecting the slurry to a second mechanical pressure which second pressure is higher than the first pressure.

11 Claims, No Drawings

PROCESS FOR DEWATERING MICROFIBRILLATED CELLULOSE

This application is a U.S. National Phase under 35 U.S.C. § 371 of International Application No. PCT/IB2014/002347, filed Nov. 5, 2014, which claims priority under 35 U.S.C. §§ 119 and 365 to Swedish Patent Application No. 1351315-5, filed Nov. 7, 2013.

FIELD OF INVENTION

The present invention relates to a process for dewatering a slurry comprising microfibrillated cellulose by subjecting the slurry to mechanical pressure.

BACKGROUND

Microfibrillated cellulose (MFC), which is a kind of nanofibrillated polysaccharide and which also is known as nanocellulose, is a material typically made from wood cellulose fibers. It can also be made from microbial sources, agricultural fibers etc. In microfibrillated cellulose the individual microfibrils have been partly or totally detached from each other.

Microfibrillated cellulose has a very high water binding capacity and it is thus very difficult to diminish the water content of a slurry comprising microfibrillated cellulose. High water content of a slurry comprising microfibrillated cellulose often prevents usage of MFC in many different application where MFC with high solids would be required.

Today there exist several different methods to remove water from a slurry comprising microfibrillated cellulose. It is for example possible to use different drying techniques. Examples of different drying techniques are evaporation or sublimation, such as spray drying or freeze drying. These techniques are however quite energy demanding and thus not so cost efficient to use in large scale processes. Also, hornification of the microfibrillated cellulose fibers often tends to occur when water is removed with different drying techniques. Hornification is when irreversible bonds between the fibers are formed. When hornification has occurred it is not possible for the fibers to expand and swell in water and the original water bonding capacity of the fibers is thus lost. The hornification may be prevented by addition of chemicals which physically prevent or modify the fibers in such way that the formation of bonds between cellulose fibers are limited or prevented. CA1208631A describes a process to re-disperse dried microfibrillated cellulose by addition of additives that will prevent the fibrils from bonding to each other and thus also prevents hornification of the fibers.

WO2012156880 describes dewatering of microfibrillated cellulose by the use of an electric field. By the use of an electric field it is possible to increase the dewatering of MFC. This is however quite a slow, complicated and energy consuming process.

Previously, mechanical dewatering, such as centrifugation, sedimentation and filtration, in order to remove water from a slurry comprising microfibrillated cellulose, has not been very successfully mainly due to that the characteristics of the slurry. Microfibrillated cellulose at a certain dry content is in form of a gel. One problem with pressing a gel is that the gel will "escape" through all possible openings when the mechanical pressure is applied, i.e. not only water will be removed through the intended openings. Furthermore, if a wire is used during the pressing, the microfibrillated cellulose has a tendency to clog the wire. Filtration is a method that also can be used. However it is very difficult to remove water from a slurry comprising MFC by filtration due to the dense web formed by the slurry which usually requires excessively high pressures and long filtration times.

There is thus a need for an improved process for dewatering of a slurry comprising microfibrillated cellulose.

SUMMARY OF INVENTION

The object of the present invention is to provide a process for the dewatering a slurry comprising microfibrillated cellulose in an improved way.

This object, as well as other objects and advantages, is achieved by the process according to claim 1. The present invention relates to a process for dewatering a slurry comprising microfibrillated cellulose wherein the process comprises the steps of, providing a slurry comprising microfibrillated cellulose and a liquid, subjecting the slurry to a first mechanical pressure in order to dewater the slurry, subjecting the slurry to a second mechanical pressure in order to further dewater the slurry, wherein the second pressure is higher than the first pressure. It has been shown that by subjecting a slurry comprising microfibrillated cellulose to an increasing mechanical pressure in subsequent treatment steps, it is possible to mechanically dewater the slurry in a very good and efficient way.

The process may further comprise the step of subjecting the slurry to a third mechanical pressure which third pressure is higher than the second pressure. By treating the slurry in three subsequent steps it has been shown that the efficiency of the dewatering can be even further increased.

The slurry is preferably conducted between two wires before the slurry is subjected to the first mechanical pressure. It is preferred that the slurry is subjected to the mechanical pressure when the slurry is between two wires, e.g. by the use of a double wire dewatering equipment. It may be preferred to use the double wire dewatering equipment in each subsequent treatment step in which the slurry is subjected to mechanical pressure.

The slurry is preferably subjected to the first, second and/or third mechanical pressure by subjecting the slurry through a wedge gap. The wedge gap subjects the slurry to an increasing pressure as the slurry passes through the gap. It has been shown that the use of a wedge gap is a very gentle process step which has been shown to be able to dewater a slurry comprising microfibrillated cellulose in a very efficient way. It may be preferred to use the wedge gap in the first dewatering step.

The slurry may be subjected to the first, second and/or third mechanical pressure by conducting the slurry over a roll having a first roll diameter. The slurry may further be subjected to the second and/or third mechanical pressure by conducting the slurry over a roll having a second roll diameter said second roll diameter being smaller than the first roll diameter. It may be preferred to conduct the slurry over more than one roll having a second roll diameter. It was found that by conducting the slurry over rolls the dewatering of the slurry can be done in a good way.

The slurry is preferably conducted between two wires that are conducted over the roll/s. By conducting double wires over a roll, the pressure on the outer wire, e.g. the wire that not is in contact with the roll, will increase and in this way will the slurry, which is located between the wires, be subjected to an increased pressure. By conducting the wires over a roll having a first large diameter the slurry will be subjected to a specific mechanical pressure. Thereafter, by conducting the wires over a second roll with a second smaller diameter the pressure on the outer wire will increase due to the decreased diameter roll. In this way, the slurry will be subjected to a higher pressure compared to when the wires were conducted over the first roll.

It may also be possible to subject the slurry to the first, second and/or third mechanical pressure by conducting the slurry to a decanter-centrifuge and that the slurry is subjected to the second and/or third mechanical pressure by conducting the slurry to a screw press.

The dry content of the slurry comprising microfibrillated cellulose before the slurry, is subjected to the first mechanical pressure is preferably about 0.1-10% by weight and the dry content of the dewatered slurry comprising microfibrillated cellulose is preferably about 1-50% by weight.

DETAILED DESCRIPTION OF THE INVENTION

The present invention relates to a process for dewatering a slurry comprising microfibrillated cellulose and a liquid. Due to the characteristics of microfibrillated cellulose, e.g. its size, size distribution and fiber bonds, it is normally very difficult to dewater a slurry comprising microfibrillated cellulose.

It was surprisingly found that by subjecting a slurry comprising microfibrillated cellulose to an increasing mechanical pressure in at least two subsequent steps, the dewatering can be improved. It was thus found that it was possible to dewater the slurry by only subjecting the slurry to mechanical pressures, i.e. no other dewatering methods was used, such as increased temperature, electro-osmosis, electric field etc.

Definition of Microfibrillated Cellulose

The microfibrillated cellulose (MFC) is also known as nanocellulose. It is a material typically made from wood cellulose fibers, both from hardwood or softwood fibers. It can also be made from microbial sources, e.g. seaweed fermented fibers, agricultural fibers such as wheat straw pulp, bamboo or other non-wood fiber sources. In microfibrillated cellulose the individual microfibrils have been partly or totally detached from each other. A microfibrillated cellulose fibril is normally very thin (e.g. a width of 5-200 nm) and the length is often between 100 nm to 10 µm. However, the microfibrils may also be longer, for example between 10-200 µm, even lengths of 2000 µm can be found due to wide length distribution.

Fibers that have been fibrillated and which have microfibrils on the surface and microfibrils that are separated and located in a water phase of a slurry are included in the definition of MFC.

Furthermore, cellulose whiskers, microcrystalline cellulose (MCC), microcellulose (MC), nanocrystalline cellulose (NCC), nanofibrillated cellulose (NFC) or regenerated cellulose fibers and particles are also included in the definition of MFC.

The fibrils may also be polymer coated fibrils, i.e. a modified fibril either chemically or physically, being thus either hydrophilic or hydrophobic.

Microfibrillated cellulose (MFC) can be produced in a number of different ways. It is possible to mechanically treat cellulosic fibers forming microfibrils. The production of nanocellulose or microfibrillated cellulose with bacteria, or fermentation, is another option. It is also possible to produce microfibrils from cellulose by the aid of different chemicals and/or enzymes which will break the interfibrillar bonds, or even dissolve the fibers and fibrills. One example of production of microfibrillated cellulose (MFC) is shown in WO2007091942 which describes production of MFC by the aid of refining in combination with addition of an enzyme.

Definition of Dewatering

With dewatering of the slurry, it is meant that the liquid is removed from the slurry and thus that the dry content of the slurry is increased.

The present invention relates to a process for dewatering a slurry comprising microfibrillated cellulose wherein the process comprises the steps of, providing a slurry comprising microfibrillated cellulose and a liquid, subjecting the slurry to a first mechanical pressure in order to dewater the slurry, subjecting the slurry to a second mechanical pressure in order to further dewater the slurry, wherein the second pressure is higher than the first pressure. It may be advantageous to dewater the slurry also in a third step by subjecting the slurry to a third mechanical pressure which third mechanical pressure is higher than the second pressure. Depending on the dry content of the slurry being subjected to the dewatering steps, the number of steps required in order to receive a slurry with the desired dry content may vary. It is possible to subject the slurry to more than three different mechanical pressure wherein the mechanical pressure in each subsequent step is higher than the pressure in the previous step. It may be preferred to subject the slurry to four, five, six or seven subsequent mechanical pressures.

It has been shown that by dewatering a slurry comprising microfibrillated cellulose, by subjecting the slurry to at least two mechanical dewatering steps with increased pressure according to the invention, no substantial hornification of the microfibrillated fibers will occur. It is thus possible for the dewatered microfibrillated cellulose, to swell when the microfibrillated cellulose is redispersed in water. This is of great importance when the microfibrillated cellulose, for example is used as a strength additive, a thickener or as a viscosity modifier. Furthermore, the bonding ability of the dewatered microfibrillated cellulose is also very good, i.e. no substantial decrease in bonding ability has been seen. Furthermore, the process for dewatering a slurry according to the invention makes it possible to dewater the slurry in a very energy efficient way.

The slurry comprises microfibrillated cellulose and a liquid. The liquid may be water, e.g. de-ionized water, a solvent and mixtures of different solvents and/or liquids. The solvent may be an alcohol, such as isopropanol, polyethylene glycol, glycol or ethanol. Solvents, such as isopropanol, can change the surface tension of the slurry and this will promote dewatering.

The slurry may also comprise fibers of regular length. It is however, preferred to use a slurry comprising high amounts of microfibrillated cellulose. A slurry comprising microfibrillated cellulose in an amount of 80-100% by weight, or 80-90% by weight, is often preferred. In many cases it is preferred that the slurry comprises 100% of microfibrillated cellulose, i.e. no fibers of longer size is present. The amount of microfibrillated cellulose depends on the end use of the microfibrillated cellulose.

The slurry is preferably conducted between two wires before the slurry is subjected to the first mechanical pressure. It is preferred that the slurry is subjected to the mechanical pressure when the slurry is between two wires, e.g. by the use of a double wire dewatering equipment. It may be preferred to use the double wire dewatering equipment in each subsequent treatment step in which the slurry is subjected to mechanical pressure. It has been shown that by subjecting the slurry between two wires, i.e. to the use a double wire dewatering equipment, makes it possible to dewater a slurry comprising microfibrillated cellulose according to the present invention in a very good way. It was surprisingly found that it was possible to increase the dry content to quite high levels, i.e. dry contents up to 50% by weight, by conducting the slurry in between two wires and thereafter subjecting the slurry to increasing pressure in subsequent steps. One theory of why it works so well with the use of double wires, is that when the slurry is slowly being subjected to an increased pressure, the slurry forms a filter cake, which tends to stay between the wires.

The slurry is preferably subjected to the first, second and/or third mechanical pressure by subjecting the slurry through a wedge gap. The wedge gap subjects the slurry to an increasing pressure as the slurry passes through the gap. It has been shown that the use of a wedge gap is a very gentle process step which has been shown to be able to dewater a slurry comprising MFC in a very efficient way. It may be preferred to use the wedge gap in the first dewatering step. The pressure in the wedge gap varies preferably between 0.1-1 MPa. The slurry is subjected to the pressure in the wedge gap for a period of 1 second to 10 minutes depending on the dry content of the slurry entering the wedge gap and on the desired dry content of the slurry being fed from the wedge gap.

The slurry may be subjected to the first, second and/or third mechanical pressure by conducting the slurry over a roll having a first roll diameter. The slurry may further be subjected to the second and/or third mechanical pressure by conducting the slurry over a roll having a second roll diameter said second roll diameter being smaller than the first roll diameter. It may be preferred to conduct the slurry over more than one roll having a second roll diameter. The slurry is preferably conducted between two wires that are conducted over the roll/s. By conducting the double wire over a roll, the pressure on the outer wire, e.g. the wire that not is in contact with the roll, will increase and in this way the slurry, which is located between the wires, will be subjected to an increased pressure. By conducting the wires over a roll having a first large diameter the slurry will be subjected to a specific mechanical pressure. Thereafter, by conducting the wires over a second roll with a second smaller diameter, the pressure on the outer wire will increase due to the decreased diameter roll this is due to that the speed difference between the wires increases when the diameter of the rolls diminishes. In this way, the slurry will be subjected to a higher pressure when being conducted over the second roll compared to when it was conducted over the roll with the first diameter. It is preferred to alternate which wire that is the "outer" wire when conducting the wires over more than one roll. In this way the slurry which is located between the wires will be subjected to increased pressure on both sides which will improve the dewatering of the slurry. The diameter of the first roll is preferably between 40-140 cm and the tension of the wires being conducted over the roll is preferably between 30-150 N/cm. The diameter of the second roll is preferably between 20-80 cm and the tension of the wires being conducted over the roll is preferably between 30-150 N/cm.

The speed of the wires during the dewatering process may be between 0.1-200 m/min. The speed varies depending on the dry content of the slurry, the properties of the microfibrillated cellulose of the slurry and on the pressure of each dewatering step.

It may be preferred to use a wire with an air permeability of about 350 CFM (Cubic Feet per Minute) and has a water permeability of 326 mm/s@2 kPa. However, other values of the wires may also be used, depending on the properties of the microfibrillated cellulose being dewatered.

It may also be possible to subject the slurry to the first, second and/or third mechanical pressure by conducting the slurry to a decanter-centrifuge and that the slurry is subjected to the second and/or third mechanical pressure by conducting the slurry to a screw press. It was found that the use of a decanter-centrifuge makes it possible to use centrifugal forces to separate the solid material from the liquid. Depending on the properties of the microfibrillated cellulose, at a certain stage the decanter centrifuge may not be able to further increase the dry content of the slurry. It was thus found that by subjecting the slurry to the second and/or third mechanical pressure in a screw press, it was possible to further increase the dry content of the slurry in a very efficient way. It may be possible to use more than one decanter-centrifuge and/or screw presses.

The dry content of the slurry comprising microfibrillated cellulose before the slurry is being subjected to the first mechanical pressure is preferably about 0.1-10% by weight. The slurry may be dewatered in any known way, e.g. by the use of a gravity table, before the slurry is subjected to the dewatering according to the invention. It is important that the dry content of the slurry is not too low since it should be kept between the wires. It must be possible to compress the slurry in order for it to be kept between the wires and not to flow out from the sides or through the wire. The dry content of the dewatered slurry comprising microfibrillated cellulose is preferably about 1-50% by weight. Even though the dry content is increased, the properties of the microfibrillated cellulose after dilution of water are maintained, e.g. the water swelling, re-dispersion and strength properties.

EXAMPLE

A slurry comprising microfibrillated cellulose and water with a consistency of 3.5% by weight was subjected to a mechanical dewatering process in which the slurry:
  was conducted to a gravity table in which the dry content was increased to about 8% by weight,
  the slurry was thereafter conducted in between two wires, i.e. in between a double wire, and the wires were conducted through a wedge gap in which the slurry was subjected to a first mechanical pressure,
  the slurry was thereafter conducted over a first roll having a first diameter of 700 mm where the slurry was subjected to a second mechanical pressure,
  the slurry was thereafter conducted over a second roll having a second diameter of 500 mm where the slurry was subjected to a third mechanical pressure.

The dewatered slurry received a dry content of 31% by weight and no unwanted losses of the slurry through cavities etc, could be noticed during the dewatering.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for dewatering a slurry comprising a microfibrillated cellulose by only subjecting the slurry to a mechanical pressure, without significant hornification of the microfibrillated cellulose, wherein the process comprises the following steps:
  providing a slurry comprising a microfibrillated cellulose and a liquid,
  subjecting the slurry to a first mechanical pressure in order to dewater the slurry, and subjecting the slurry to a second mechanical pressure which second pressure is higher than the first pressure.

2. The process according to claim 1 wherein the process further comprises the step of subjecting the slurry to a third mechanical pressure which third pressure is higher than the second pressure.

3. The process according to claim 1, wherein the slurry is conducted between two wires before the slurry is subjected to the first mechanical pressure.

4. The process according to claim 1, wherein the slurry is subjected to the first and second mechanical pressure by conducting the slurry through a wedge gap.

5. The process according to claim 1, wherein the slurry is subjected to the first and second pressure by conducting the slurry over a roll having a first roll diameter.

6. The process according to claim 5 wherein the slurry is subjected to the second mechanical pressure by conducting the slurry over a roll having a second roll diameter said second roll diameter being smaller than the first roll diameter.

7. The process according to claim 6 wherein the slurry is conducted over more than one roll having a second roll diameter.

8. The process according to claim 1, wherein the slurry is subjected to the first and second mechanical pressure by conducting the slurry to a decanter-centrifuge.

9. The process according to claim 1, wherein the slurry is subjected to the second mechanical pressure by conducting the slurry to a screw press.

10. The process according to claim 1, wherein the dry content of the slurry comprising a microfibrillated cellulose before the dewatering is 0.1-10% by weight.

11. The process according to claim 1, wherein the dry content of the dewatered slurry comprising a microfibrillated cellulose is 1-50% by weight.

* * * * *